June 30, 1970     B. J. BEUSINK ET AL     3,517,494

MOWING MACHINE HAVING AN ECCENTRIC DRIVE

Filed July 11, 1967     4 Sheets-Sheet 1

INVENTORS
BERNARD J. BEUSINK
ALEXANDRE HOROWITZ
BY WILHELMUS H. M. VAN DEN HEUVE

AGENT

INVENTORS
BERNARD J. BEUSINK
ALEXANDRE HOROWITZ
BY WILHELMUS H. M. VAN DEN HEUVL

AGENT

INVENTORS
BERNARD J. BEUSINK
ALEXANDRE HOROWITZ
WILHELMUS H. M. VAN DEN HEUVEL
BY

AGENT

United States Patent Office 3,517,494
Patented June 30, 1970

3,517,494
MOWING MACHINES HAVING AN ECCENTRIC DRIVE
Bernard Joseph Beusink, Oerle, and Alexandre Horowitz, Eindhoven, Netherlands, and Wilhelmus Henricus Maria Van Den Heuvel, Saverne, France, assignors, by mesne assignments, to U.S. Philips Corporation, New York, N.Y., a corporation of Delaware
Filed July 11, 1967, Ser. No. 652,445
Int. Cl. A01d 55/00
U.S. Cl. 56—293                                8 Claims

ABSTRACT OF THE DISCLOSURE

A mowing machine in which two series of oscillating knives cooperate with a plurality of fixed knives in a cutting action. Each of the oscillating series is mechanically linked to an eccentric drive such that each series will symmetrically move in opposite directions for vibration-free operation.

---

Figure 1:
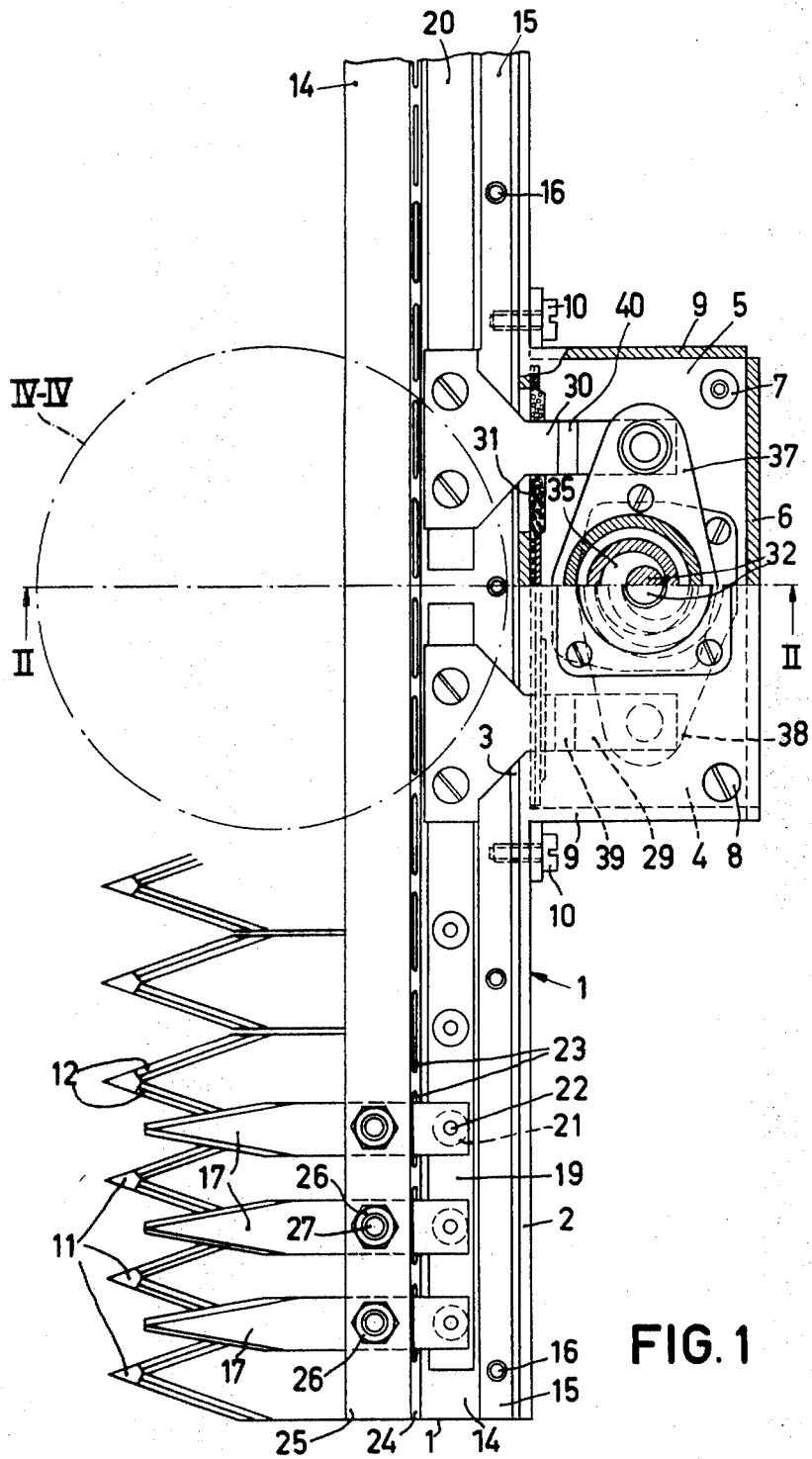

This invention relates to reciprocating mowing machines, in particular to a mowing machine having a cutter bar, in which at least one of the series of lower and upper knives is driven in an oscillatory movement, the other series of knives being fixedly secured on the cutter bar.

This known construction affords the advantage that the knives moved in the oscillatory manner can be individually supported on the cutter bar so that they need no longer be integral with a bar moved in a reciprocatory manner. Thus, a light-weight driving bar is sufficient and the knives may consist of light plates so that the mass of the parts moved is reduced.

The invention has for its object to provide a further improvement of this type of mowing machine with respect to the vibration-free operation and the energy consumption. This is particularly important for the hand mowers used as lawn mowers.

The invention is characterized in that pivotally arranged knives of the same series are subdivided into separately driven groups of knives, which groups of knives are driven, in opposite directions.

The invention utilizes the fact that the use of pivotal knives renders it possible to cover the part of the land level where the two movements meet.

In known grass-shearing machines in which the series of lower knives and the series of upper knives are driven in opposite directions and the individual knives co-operate in a scissors-like fashion, the drive is already balanced to a certain extent. Due to the subdivision of a series of knives into groups in accordance with the invention the knives of the groups are aligned so that knives not co-operating with each other perform oppositely directed movements, and the balancing is improved.

The invention is particularly effective when the lower sequence of knives is fixedly arranged. This results in a reduction of the number and the mass of the parts to be driven, simplifies the balancing of the parts and provides a compact construction, which is of particular importance for the hand mowers. An advantageous embodiment is characterized in that a housing including the driving mechanism for the driving bars of the groups of knives is arranged at the centre of the cutter bar behind the series of knives.

The compact construction of the cutter bar is improved by having two driving bars for two groups of knives arranged in line with one another and supported by the cutter bar so that they are adapted to be slidably guided in longitudinal direction, each are provided at their meeting ends with a transverse arm, which arm is individually driven by the motor shaft.

The advantages obtained by this compact construction and vibration-free operation at a comparatively high speed is most pronounced in the embodiment in which the distance between the driving arms of the knives driven in an oscillatory movement is shorter than the length of the knives from the fulcrum to the end.

In comparison with the width of the surface area covered by the cutting knife portions, the distance through which the driving bars are moved in opposite directions may be comparatively short.

Furthermore, due to the balancing obtained by the use of the invention, an arrangement is obtained in which the frictional losses are considerably reduced. This arrangement of the knives is characterized in that the knives driven in an oscillatory movement are freely disposed by their cutting edge zones on the cutting portions of the knives fixedly secured to the cutter bar and are otherwise supported only in the pivotal and driving-point bearings.

Figure 2:
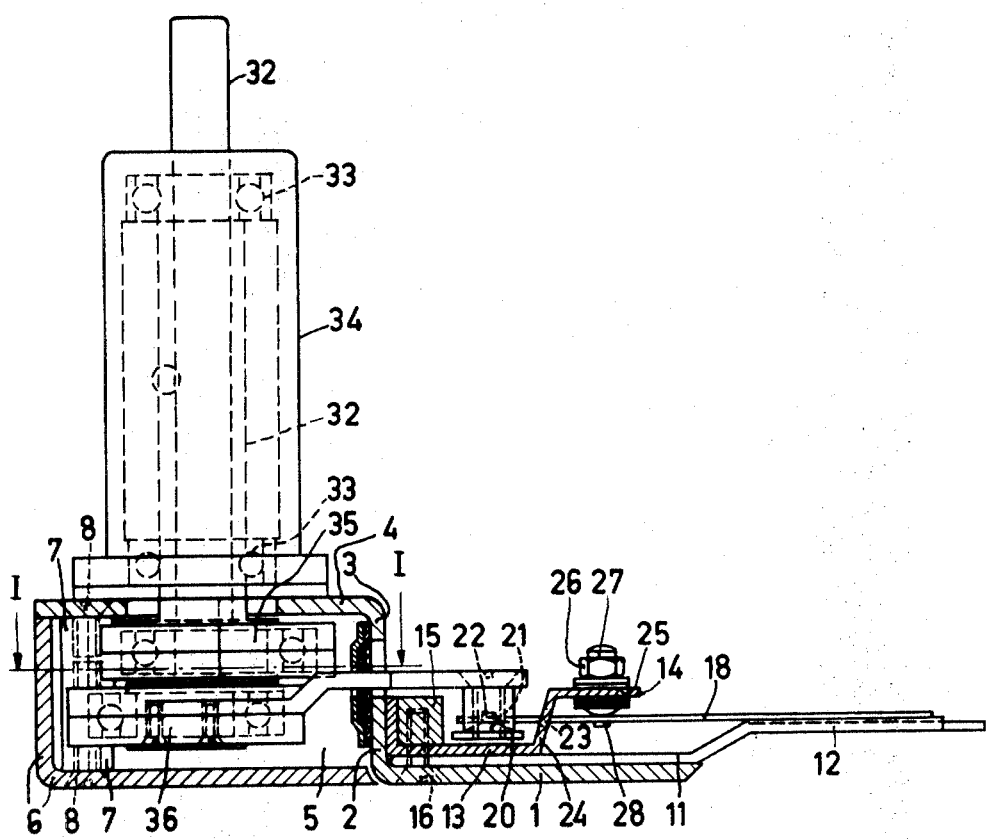
Figure 7B:
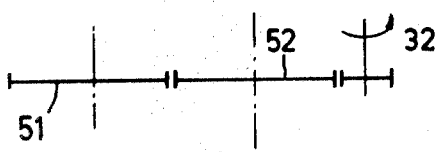
Figure 8B:
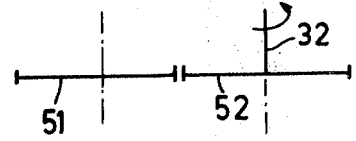
Figure 7A:
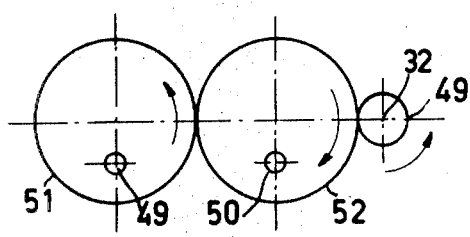
Figure 3:
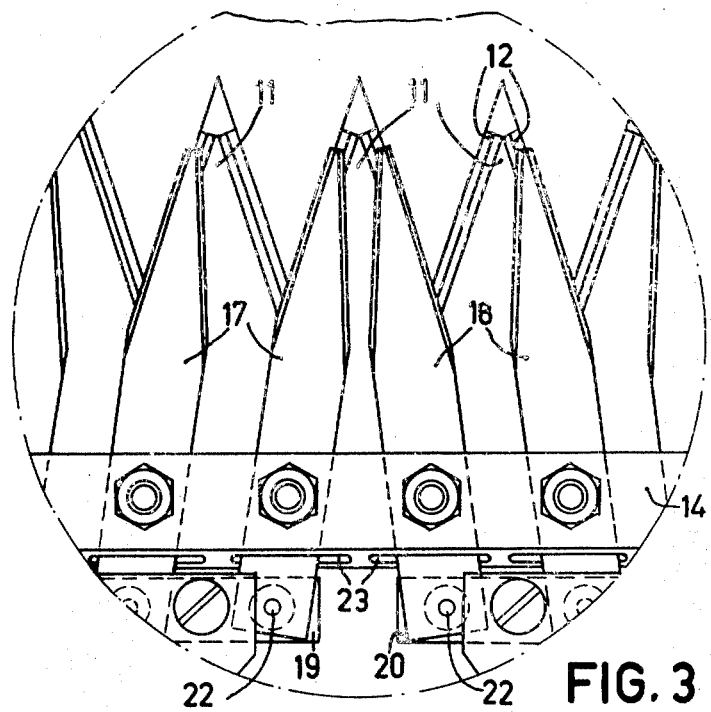
Figure 4:
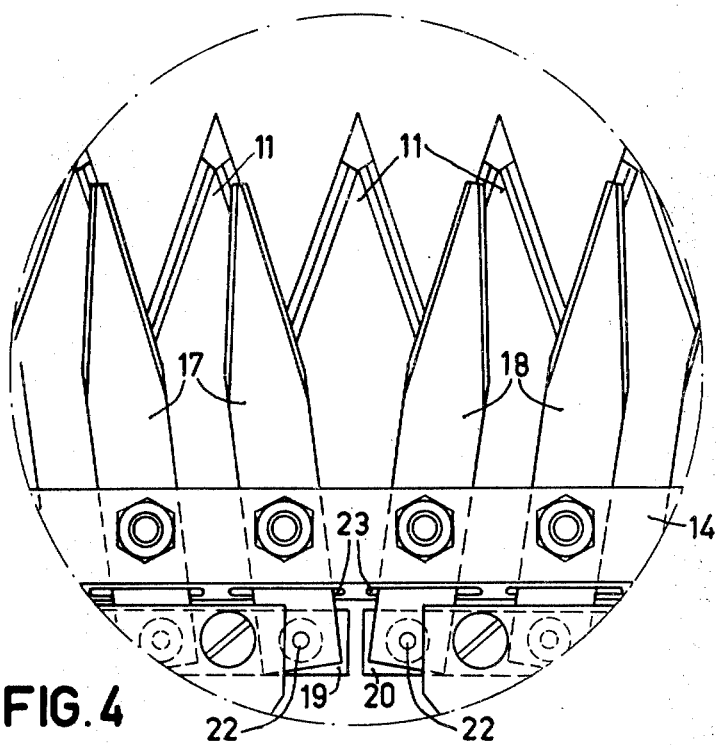
Figure 6:
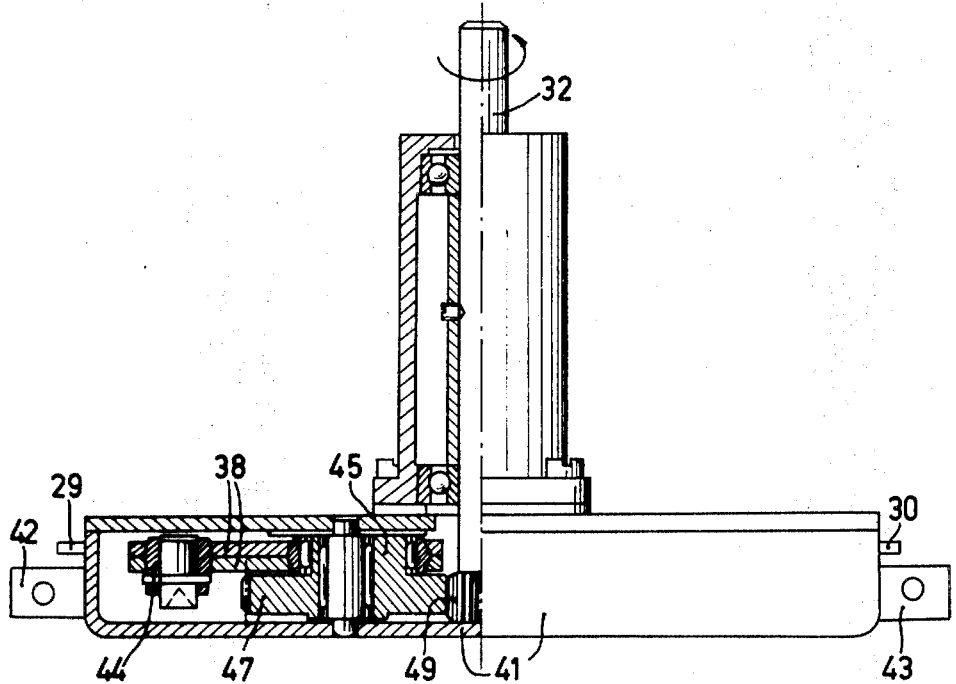
Figure 5:
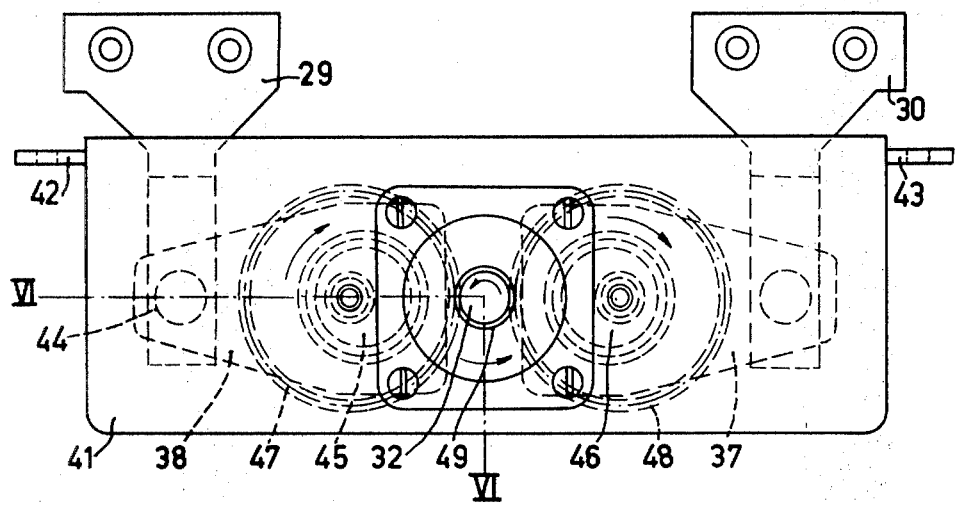

The invention will now be described more fully with reference to an embodiment shown in the drawing:

FIG. 1 is a plan view, partly in sectional elevation taken on the line I—I of FIG. 2, of a mowing machine only part of which has been omitted on the righthand side, FIG. 2 is partly a vertical sectional view and partly a side elevation of the major part of the machine taken on the line II—II of FIG. 1, FIGS. 3 and 4 are detail plan views of FIG. 2 taken on the line IV—IV of said figure, FIG. 5 is a plan view and FIG. 6 is a side elevation, partly in sectional view taken on the line VI—VI of FIG. 5, of an alternative embodiment driven by a gear-wheel, and FIGS. 7a, b and 8a, b are diagrammatic plan and side views of modifications thereof.

The cutter bar of sheet metal denoted by 1 has an upright rear side 2 which is prolonged at the centre and bent over so as to form the front side 3 and the upper surface 4 of a housing 5 which is otherwise closed by a rear lower wall 6 secured to the cutter bar by screw sleeves 7 and screws 8, side plates 9 are fixed by means of screws 10. The housing 5 includes the eccentric mechanism described hereinafter. Laterally joined knives 11 protruding in forward direction are provided on the lower side of the bar 1. They have flanged edges 12 extending obliquely in upward direction and constituting the cutting edges and their rear portions are enclosed beneath the base 13 of a gutter-shaped part (FIG. 2) of a metal strip 14 which extends throughout the length of the cutter bar 1 and is in turn fixed thereto by a bar 15 fastened by means of screws 16.

The lower series of knives 11 co-operates with two series of knives 17 and 18 disposed farther upwards and consisting of strips which are narrower than the knives 11 and which, due to the fact that they are made of comparatively thin sheet metal, have a small mass. Their tongue-shaped ends provided with cutting edges are flatly disposed on the cutting edges 12 of the knives 11 and experience frictional resistance substantially only at the area at which they perform their cutting operation. Due to their light weight, they can readily perform an oscillatory movement. In the proximity of their rear ends they are disposed on cam-shaped bodies 21 which are screwed into a light strip-shaped driving bar and which project by their pin-shaped ends 22 through openings in the knife strips 17 and 18. These knives further extend through slot-shaped apertures 23 in the upright edge 24 of the gutter-shaped part 13 of the supporting strip 14 the horizontal part 25 of which supports a series of screw bolts 27 which are fixed by nuts 26, the pin-shaped ends 28 of said screw bolts, which project through apertures in the knives 17 and 18, constituting the fixed pivotal points about which pivot the knives 18 when the driving bars 19, 20 are driven in a reciprocatory movement. It will be appreciated that the friction in said pivotal points and in the driving points 21, 22 is very low and that the said driving points need perform only a short reciprocatory movement in order to ensure that the cutting edges of the knives 17 and 18 completely cover their paths along the cutting edges 12 of the knives 11, since the lever arm between the fulcrum and the driving point is shorter than the length of the knives 17 and 18 from the fulcrum 28 to the end.

The series of pivotal knives 17 and 18 are subdivided into two groups separately designated by 17 and 18 (FIGS. 3 and 4) and which are driven individually by a separate driving bar 19 and 20, respectively, so that they are moved in opposite directions. FIG. 3 shows the position in which the cutting portions of the groups of knives 17 and 18 are moved towards each other as closely as possible and FIG. 4 shows the position in which they are moved away from each other through the maximum possible distance. The ends of the driving bars 19, 20 are located in the immediate proximity of each other in FIG. 4, while in FIG. 3 they are spaced apart by the maximum possible distance. The performance of the movements of the aligned driving bars 19 and 20 requires only a small amount of space in the longitudinal direction of the cutter bar. The part of the land level in front of the central portion of the cutter bar where the oscillating parts moving in opposite directions meet each other, is covered completely by the knives, while the use of the upper knives 17 and 18, which are narrower than the lower knives 11, affords the additional advantage that the upper knives can pivot through a comparatively large angle without the knives 17 and 18 meeting at the central part getting into contact with each other.

Therefore, use may be made of a very simple eccentric drive, a transverse arm 29 and 30, are respectively provided in the proximity of the end of each of the driving bars 19, 20. The arms are introduced into the housing 5 through a slot covered by elastic material 31. In this housing, the end of a driving shaft 32 introduced from the upper side and shown in FIG. 2 as a vertical shaft running on ball-bearings 33, extends in a housing 34 which joins the housing 5. The driving force may be transmitted to the shaft 32 in various ways, for example, by providing an electric motor in the housing 34. The part of the shaft 32 projecting in the housing 5 supports two adjacent upwardly directed eccentrics 35 and 36 the eccentric arms 37 and 38 of which are journalled on balls and are hinged to the transverse arms 30 and 29 of the driving bars 20 and 19. The eccentrics 35 and 36 have a relative phase difference of 180°. At 39 and 40 the courses of the transverse arms 29 and 30, respectively, exhibit oppositely directed jumps, as a result of which these transverse arms, the ends of which connected to the driving bars lie in one plane, can be hinged by their other ends to the eccentrics 35 and 36 with the associated eccentric arms 37 and 38 disposed adjacent each other on the shaft 32.

FIGS. 5 and 6 only show the enclosure 41 of the driving gear which is secured with the aid of tags 42, 43 to the rear side of the housing of the cutter bar 1 and from which project the said transverse arms 29, 30 to be fastened to the driving bars 19, 20 in this housing. The eccentric arms 37, 38 (the pivotal connection between the latter eccentric arm and the transverse arm 29 is shown) are journalled around the eccentrics 45 and 46 which form part of the spur gears 47 and 48 which are driven in common by a pinion 49 on the driving shaft 32.

Figure 8A:
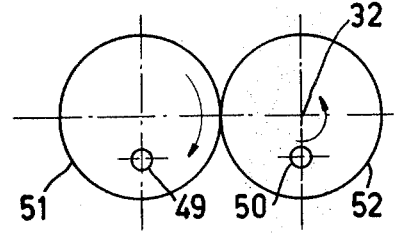

In the alternative embodiment of FIGS. 7a, b, the spur gears 51 and 52 provided with eccentric driving points 49 and 50 engage each other and one of said spur gears is directly driven by the pinion 49 on the shaft 32; in the alternative embodiment of FIGS. 8a, b, the main shaft 32 is the shaft of the spur gear 52 driving the spur gear 51.

What is claimed is:

1. A mowing machine comprising a cutter bar, a plurality of knives fixedly attached to said bar, at least two series of plural movable knives arranged in juxtaposition with said fixed knives and pivotally mounted to said bar, eccentric drive means centrally positioned with respect to the cutter bar, mechanical linkage means interconnecting each of the said series of knives with the eccentric drive means to effectuate symmetrically opposed simultaneous oscillatory movement of the knives in the respective series for achieving a cooperative cutting action with the fixed knives.

2. A mowing machine as claimed in claim 1 wherein the eccentric drive means includes pinion gear means positioned on a drive shaft, at least two spur gears commonly engaged by the pinion gear and at least two arms eccentrically pivoted to each of the respective spur gears.

3. A mowing machine as claimed in claim 1 wherein the eccentric drive means includes at least two meshing spur gears, pinion gear means for drivingly engaging one of said spur gears, and at least two arms eccentrically pivoted to each of the respective spur gears.

4. A mowing machine as claimed in claim 1 wherein the eccentric drive means includes at least two meshing spur gears, drive shaft means affixed to one of the spur gears for driving same, and at least two arms eccentrically pivoted to each of the respective spur gears.

5. A mowing machine as claimed in claim 2 wherein the mechanical linkage includes a separate driving bar means interconnecting each of the knives in the respective series and a transverse arm for interconnecting the driving bar to the eccentrically pivoted arm.

6. A mowing machine as claimed in claim 5 wherein there are two series of plural knives, the said knives being pivotably mounted to the cutter bar intermediate their ends.

7. A mowing machine as claimed in claim 6 wherein the two series of knives are driven with a relative phase difference of 180°.

8. A mowing machine comprising a cutter bar, a plurality of fixed and movable knives mounted on said bar, said movable knives being pivotally mounted to the bar and arranged in at least two series, and eccentric drive means for individually oscillating each of the said series in symmetrically opposed directions to effectuate a cutting action between the fixed and movable knives.

References Cited

UNITED STATES PATENTS 3,114,228  12/1963  Threlkeld _____ 56—265 XR

FOREIGN PATENTS 403,907  5/1943  Italy.
848,284  9/1952  Germany.

ROBERT PESHOCK, Primary Examiner